Oct. 4, 1966    A. E. R. ARNOT    3,276,634
WATER DISPENSERS
Filed June 21, 1961    3 Sheets-Sheet 2
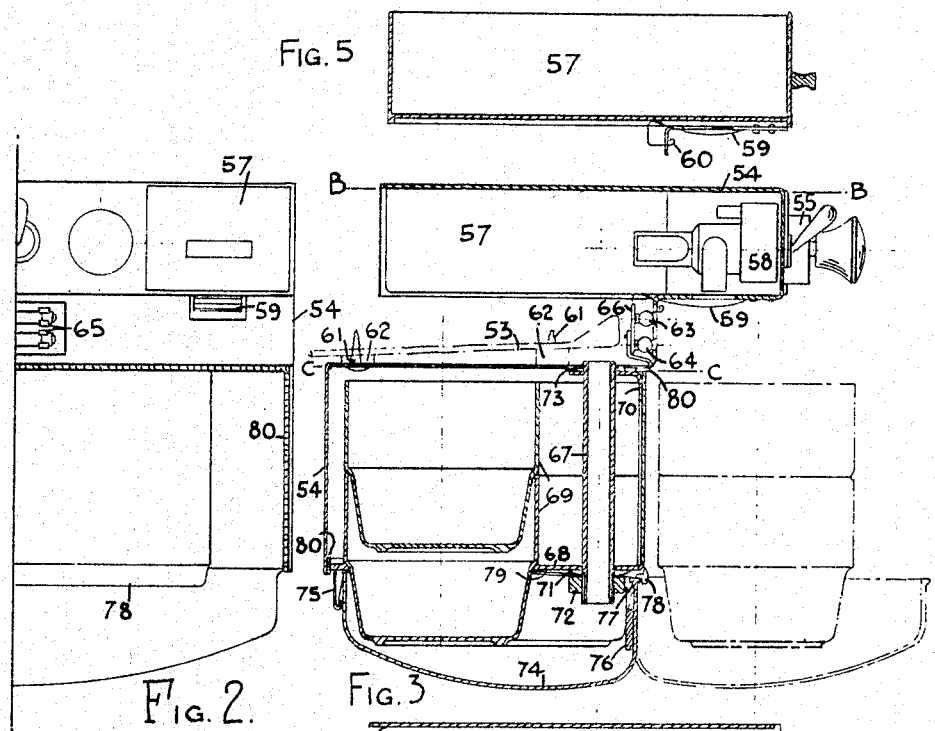
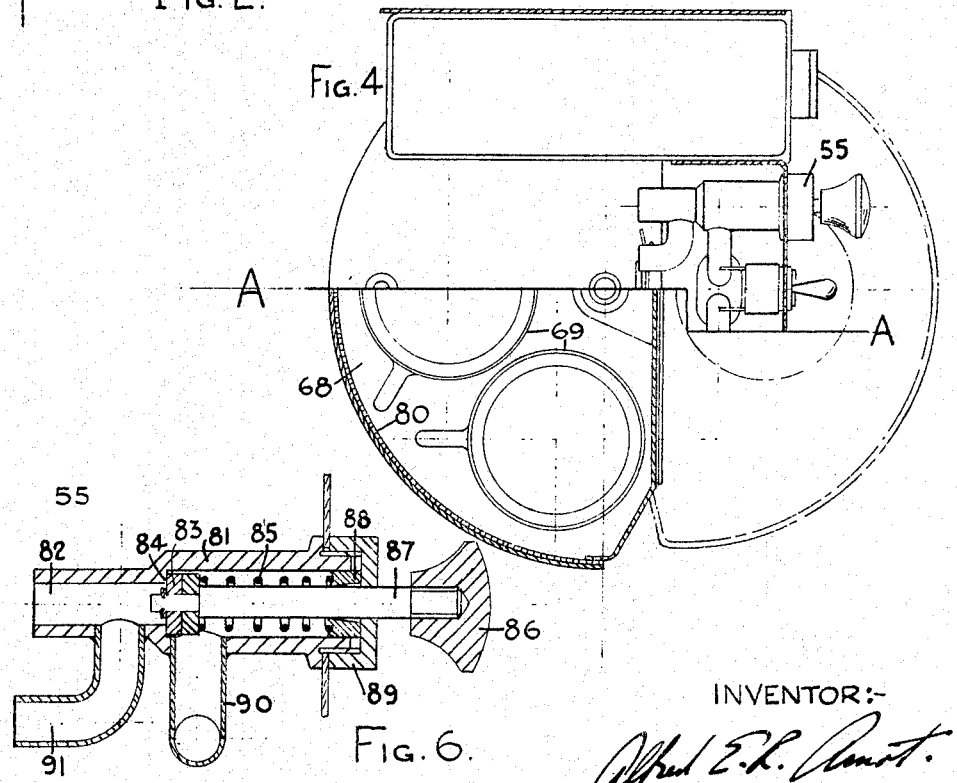
INVENTOR:-
Alfred E. R. Arnot.

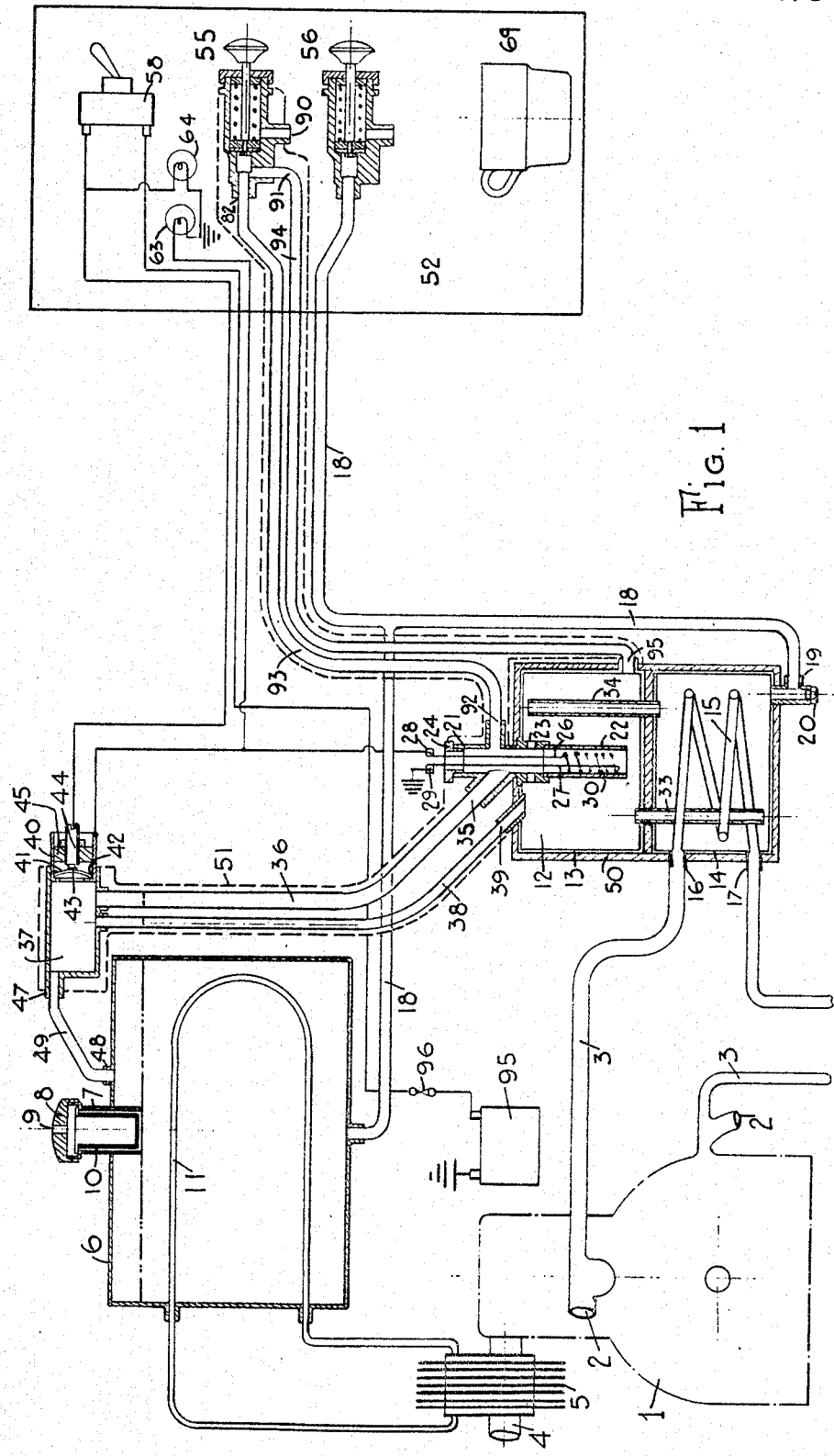

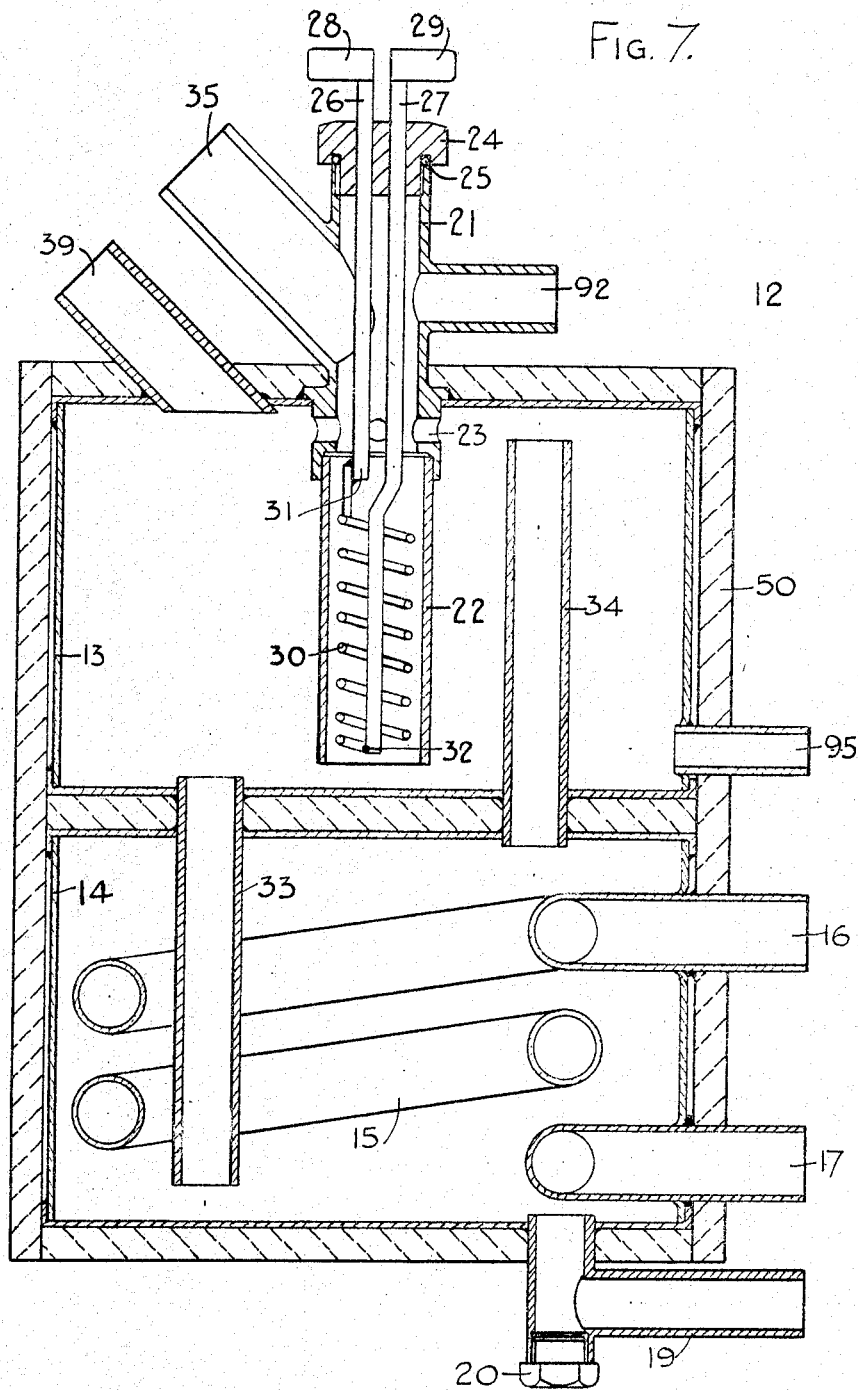

United States Patent Office 3,276,634
Patented Oct. 4, 1966

3,276,634
WATER DISPENSERS
Alfred Erwin Reginald Arnot, The Bell House, Baughurst, Basingstoke, Hampshire, England
Filed June 21, 1961, Ser. No. 120,462
Claims priority, application Great Britain, June 24, 1960, 22,141/60
18 Claims. (Cl. 222—144.5)

This invention relates to the provision of drinking and washing facilities in association with the use of internal combustion engines as in motor vehicles, boats, materials handling equipment, road-making, building, agricultural and forestry machinery and the like.

It is common experience that periods of motor vehicle driving, or working in association with engines, creates thirst which has heretofore been satisfied by the planned provision of beverages in bottles or thermally insulated containers, or by time-consuming halts at places of public refreshment.

It is also common experience that driving or working in association with internal combustion engines may entail mechanical checks, adjustments or repairs, or an atmosphere of general perspiration which requires subsequent washing facilities. This again has only been possible by the planned provision of a wet sponge in a water-retaining plastic container or chemically impregnated pads.

Hitherto motor vehicle water supply systems have failed to provide boiling water, an essential pre-requisite for such frequent needs as beverage brewing, especially tea and coffee, sterilising, etc.

The object of this invention is therefore to provide a reservoir of fresh water on motor vehicles and in association with internal combustion engine installations for washing or drinking purposes.

It is also an object to provide a means of cooling, heating or boiling water in association with an internal combustion engine installation, to provide convenient control means for the water heating and flow, and means to indicate the water temperature or state of boiling.

It is a further object to provide therewith a convenient arrangement of cups, spoons, beverage ingredients and wash basin.

In accordance with this invention there is provided a system for providing in a motor vehicle water controllable as to amount and temperature up to boiling point, comprising a reservoir for water having a filling means and an outlet, a first conduit connecting said outlet to a heater unit deriving heat from said motor, a second conduit from said heater unit to a hot water dispensing means, said heater unit having a connection to automatic heat-control means which is capable of maintaining the water in said heater unit at boiling point.

In order to carry this invention into effect there is provided on an internal combustion engine installation a reservoir for fresh water which may be of metal or plastic, rigid or deformable such as a concertina, and permanently mounted with a dirt-excluding filler or removably mounted with a quick-disconnect coupling so that it may be refilled apart from the installation; a water control valve conveniently positioned for a driver or operator with spring-return or screw mechanism, and constructed to avoid accidental operation; and a drinking vessel or wash basin or both.

There may also be provided filter or water purifying or softening means in the reservoir or filler entry or in any flow-carrying part of the installation, and such filter means may be permanent or interchangeable or impregnated with disinfecting or purifying chemical; cooling tubes or cavities within or around the reservoir connected to pump or absorption type refrigerating systems deriving power from the internal combustion engine; a heat-exchanger in which a quantity or flow of fresh water in a tank or pipe in any position in the installation is heated by means of the engine cooling water or air or lubricating oil or exhaust gases or by contact with or heat transfer from a heated part of the engine installation whether solid, liquid or gaseous and whether surrounding or surrounded by the fresh water; a boiler in which a quantity or flow of fresh water in a tank or pipe in any position in the installation, and combined with or separate from the aforesaid heat-exchanger to which it may be connected by water circulating pipes, may be brought to boiling temperature by an electric heater or by further heat exchange from the engine or exhaust system or cooling air automatic heat-control means such as; a thermostat or thermostats to regulate the temperature of or prevent excessive boiling of the water, which may operate to reduce or divert the flow of heating gases or liquid, or control switching means in an electric heater circuit, and which may act by expansion of metal or liquid or gas, or by boil-agitation of float or vane means or by pressure rise due to boiling; a temperature indicator which may comprise an indicating thermometer or visible or audible signals at a predetermined temperature; a dispenser assembly conveniently mounted for use by an operator either as an accessory or built into and styled as a part of the vehicle or machine and which may include hot and cold taps, a flow-positioning outlet, a switch or heat-diverting lever for boil-selection, an indicator lamp or buzzer or gauge for state-of-boil or temperature signalling, an illuminating lamp for convenient use of the dispenser in darkness; one or more single or stackable or expendable drinking cups in a fixed or movable frame which may have a dust-tight position or closure; a wash basin which may be rigid or of foldable plastic or expendable and may be emptied by removing and tipping or by expending or by draining through a rigid or flexible drain pipe; compartments or drawers for beverage ingredients, and for spoons, sugar, biscuits, soap and the like, and which may have translucent panels for interior illumination in cooperation with the aforesaid illuminating lamp; a hot water circulating system to ensure that the hot water tap and the pipes connected thereto are hot before water is drawn; thermal insulation of the parts both to avoid heat loss and to prevent freezing during cold weather conditions; and a system draining plug or tap which may have conveniently extended operating means.

The following is a description by way of example only of one construction according to the invention, reference being made to the accompanying drawings in which:

FIGURE 1 is a partly diagrammatic view of an installation in a motor vehicle to give cold, hot or boiling water.

FIGURE 2 is a front view of the right half of the symmetrical dispenser unit which is mounted near the driver's seat.

FIGURE 3 is a cross-sectional side view of the dispenser unit on the line AA shown on FIGURE 4.

FIGURE 4 shows a plan view of FIGURE 3, the upper portion being a section on the line BB shown on FIGURE 3, and the lower portion being a section on the line CC shown on FIGURE 3.

FIGURE 5 is a scrap view of a drawer and spring retainer as used in the dispenser.

FIGURE 6 is a cross-sectional view of the hot water tap as used in the dispenser.

FIGURE 7 is a cross-sectional view of combined heat exchanger and boiling chambers as used in the installation.

Referring first to FIGURE 1, a motor vehicle is provided with engine 1, radiator water connections 2 and heater water connections 3. The exhaust 4 serves to provide heat for an absorption refrigerator unit 5.

Under the vehicle bonnet is mounted a cylindrical plastic tank 6, having a capacity of about one and a half gallons, fitted with a filler tube 7 and cover cap 8 with vent hole 9. A replaceable filter cup 10 of medicated paper rests in the tube 7. Within the tank 6 a cooling coil 11 circulates refrigerant from the refrigerator 5.

Also under the vehicle bonnet and at a lower level than the tank is mounted a heat exchanger and boiling unit 12 more fully detailed in FIGURE 7. Two cylindrical brass tanks 13 and 14 are mounted one above the other with their axes vertical, each having a capacity of about one and a half pints. In the lower tank 14 heat exchanger coils 15 are connected by outlets 16, 17 in series with the hot water circulating pipe 3 of the car heater system. Fresh water from the tank 6 is supplied by flexible plastic tube 18 to a connector 19 in the base of the tank 14, which is also fitted with a drain plug 20.

The upper tank 13 is provided with a brass tube assembly 21 to the inner end of which is cemented a ceramic or internally insulated tube 22. Above the tube 22 but below the top of the tank 13 a ring of holes 23 extend radially around the lower section of tube assembly 21. Screwed into the top of tube 21 is a moulded insulating plug 24 carrying a water-sealing rubber ring 25, and through which are cemented two nickel chrome rods 26, 27 having electrical connection flags 28, 29 at their outer ends. Rod 26 extends downwardly until it is about ¼" below the top edge of the ceramic tube 22; rod 27 remains parallel with it, but on passing its end is cranked to lie along the central axis of tube 22 and terminates about ¼" above the lower edge of this tube. A heater coil of nickel chrome wire 30 is placed with its axis coincident with the lower part of rod 27, and its upper and lower ends are welded to rods 26 and 27 at 31 and 32. The rod and heater coil assembly may be covered with a thin film of epoxy resin or silicone varnish or vitreous enamel or similar insulation to eliminate electrolysis, or may be a conventional sheathed element.

Between the tanks 13 and 14 there are provided connecting tubes 33, 34 which serve to permit cool water to flow from the bottom of tank 13 to the bottom of tank 14, and hot water to flow from the top of tank 14 to the top of tank 13 respectively. The two tanks are encased in and separated by a layer of cork 50 about ¼" thick.

An angularly inclined connection 35 on the tube assembly 21 is connected by a tube 36 to a small cylinder 37 about 1½" diameter and 3" long, mounted with its axis horizontal and above the tank 6. A further tube 38 returns from the cylinder 37 to the tank 13 through a connection 39.

At one end of the cylinder 37 is mounted a thermostat 40 comprising a dished bimetal diaphragm 41 with its high expansion side which may be incorrodible or plated or thinly covered towards the interior of the cylinder 37, and backed by a rubber sealing ring 42. At the centre of the outer face of the diaphragm is set a silver contact 43 making normally closed contact with a silver-tipped contact screw 44 carried in a moulded insulating ring 45. A tube 49 connects an outlet 47 at the top of the cylinder 37 to a connection 48 on the top of tank 6. Tubes 36 and 38 are thermally insulated with glass fibre in a protective plastic tube, and cylinder 37 is covered with cork insulation as indicated by the enveloping dotted lines 51.

Close to the driver in the vehicle there is mounted a dispenser unit 52 on a shelf or glove-rack 53 as indicated in FIGURE 3. The unit 52 comprises a main frame carrying in its upper section a hot water tap 55, a cold water tap 56, two drawers 57 of translucent plastic, a switch 58, and spring leaves 59 pressing upwardly under the drawers 57 in stopped-end grooves, thus ensuring a seal between the upper edges of the drawers and the underside of the top of the frame 54 and also preventing complete withdrawal of the drawers unless the tail 60 of the springs 59 is deliberately depressed.

The centre section of the frame 54 drops downwardly to provide at the rear a space for over-lapping a shelf 53 to which it is secured by self-tapping screws 61 and levelling spacers 62. At the front centre of this section of the frame 54 there is provided a rectangular cut-out behind which are replaceably mounted two tubular lamps 63, 64 by clips 65 on an insulating panel 66.

The lower section of the frame 54 comprises a vertical metal shield of almost semi-circular extent. Welded at the centre of this circle and depending downwards is an axle tube 67 on which is rotatably mounted a cup-holder frame 68 comprising a substantially semi-circular flat metal base pierced with three circular holes for the mounting of plastic stackable cups 69 and a central hole to cooperate with the axle 67. Extending vertically upwards at the front of this base is a metal closure shield substantially sealing the semicircular chamber at its rear. A further bracket 70 spot-welded to the top of the shield provides an upper bearing hole to constrain motion of the frame 68 around the axle 67, and a spring disc washer 71 adjustably compressed by a self-locking nut 72 gives frictional control of rotation by applying pressure on a fibre washer 73. The centre of rotation 67 is chosen so that the cups 69 are conveniently brought below the outlets of the taps 55, 56 when the frame 68 is rotated as shown in dotted outline.

Beneath the flat base of frame 68 is mounted a plastic wash bowl 74 having an upper edge closely following the outline of base 68. A spring clip 75 locates the rear edge of the bowl and is riveted to the lower rear face of base 68; a bracket 76 depending from the lower front edge of base 68 is provided with a recess 77 accommodating an inner lip on the plastic bowl 74 which is held in position by a latch strip 78 held downwardly by leaf springs 79. Raising of the latch strip 78 permits withdrawal of the bowl, which may then be replaced forwardly facing as shown in dotted outline and thus similarly held in place by the latch strip for use as a wash bowl.

Around the inner edges of frame 54 which are opposite to the sealing edges of frame 68 when in the closed position, a narrow ribbon 80 of nylon pile is cemented to effect a dust seal between the metal parts.

The hot water tap 55 is shown cross-sectioned in FIGURE 6. It consists of a body 81 having a hose connection 82 at the rear, the flow of water being stopped by a flat sealing washer 83 on a seating 84. The sealing washer is loaded against its seating by a bronze spring 85, which is overcome by pulling a knob 86 on a stem 87 passing through a rubber seal 88 and a screwed cap 89 which also serves for panel-mounting. An elbow tube 90 projects from the side of the body 81 in a position past the seating, being directed downwards above the filling position of the cups. A further elbow connection 91 is similarly projected from the body before the seating and is directed backwards, being used for preheating of the hot water circuit as will hereinafter be described. The cold water tap is of similar construction, but the elbow 90 is symmetrically of opposite hand and the elbow 91 is omitted.

Referring again to FIGURE 1, connections are made between the cold tap 56 and the tank 6 by tube 18; from outlet 92 on tank 13 through tube 93 to hot tap connection 82; and from hot tap connection 91 by tube 94 to connection 95 on tank 13. The tubes 93 and 94 as well as the hot tap 55 are thermally insulated with a wrapping of glass fibre in a protective tube. Electrical connections are made from the live pole of the vehicle battery 95 through a fuse 96 to the switch 58; from the switch to the contact 44 of the thermostat 40 and to the lamp 64; from the contact 43 of the thermostat to the flag 28 of the heating element and to the indicator lamp 63; and from the flag 29 of the heater element to the chassis or other pole of the battery.

It should be noted in the installation that the taps 55 and 56 are to be mounted on a level substantially at the bottom of tank 6 or lower and preferably above the top of the boiling tank 13 to prevent its being drained in use, with consequent risk of over-heating the element 30, and to promote circulation of the tap-heating water.

During normal use of the vehicle, it will be seen that hot exhaust gases will activate the refrigerator 5 and cool the water in tank 6 at all times whilst the engine 1 is running, so that cold drinking water is readily available at the tap 56. At the same time the vehicle heater circulating water is permanently passing through the heat exchanger coils 15 in the tank 14 and heating the surrounding water, which rises through tube 34 into the tank 13 whilst colder water descends through tube 33 and eventually brings the contents of both tanks 13 and 14 to a temperature substantially the same as that of the water in the engine water jacket. The heated water also rises through the outlet 92 to the tap 55 and returns from the tap through tube 94 to the lower connection 95 in the tank 13; thus the whole of the hot water tube and tap circuit is kept at near boiling temperature and hot water is always immediately available at the tap 55 after the engine has been running for about a quarter of an hour.

In order to produce boiling water for making beverages, the switch 58 is operated to pass current through the heater element 30, about 30 amps. being convenient to cause boiling in approximately four minutes under normal engine temperature and thermal insulation conditions. The lamp 64 is at the same time illuminated to show that the unit is switched on, to provide light for making beverages or washing in darkness, and to illuminate the interior of the drawers 57 through their translucent sides.

The lamp 63 is also illuminated and is colored red; it is connected across the element 30 which is under control of the thermostat 40, and when boiling of the water causes intermittent switching of the thermostat as is hereinafter explained, the red lamp will flash on and off to show that boiling is taking place.

As the element 30 increases the temperature in the tube 22, the water rises and circulates through the holes 23 and through the tap pre-heating circuit from outlet 92 to return connection 95. The cylinder 37 being above water level remains comparatively cool, and the thermostat which is set to open its contacts at about 90° C.–95° C. remains closed. On reaching boiling point, however, the water in the tube 22 around the heating element 30 is violently agitated with bubbles of steam and air, which rise in the tube 36 and carry boiling water into the cylinder 37, where a division takes place by the vapour passing through outlet 47 into the tube 49 and tank 6, and the water returning to the tank 13 through the tube 38. Meanwhile the presence of boiling water in the cylinder has operated the thermostat 40, extinguishing the indicator lamp 63 and switching off current from the heater element so that the water agitation ceases and the cylinder 37 is emptied and cools down, the thermostat contacts then reclosing to repeat the cycle.

The vehicle driver, seeing the flashing light indicative of boiling, rotates the frame 68 to bring a cup centrally below the tap outlets, places in it the beverage ingredients or portions from the drawers 57 and pulls the knob 86 on the tap 55 to pour boiling water into the cup. This can be repeated until the full contents of the tank 13 have been used, by which time the preheater contents of tank 14 will have risen into tank 13 and in general will already have been brought to boiling point. After use the switch 58 is turned off to save current and prevent excessive evaporation.

In some vehicle installations the vehicle heater circulating water is blocked by a valve when the vehicle heater itself is not in use. In such a case a bypass valve may be installed, or the heat-exchanger coils may be connected in parallel with the car heater circuit.

The flashing indicator lamp 63 may be connected across the thermostat contacts so that it does not light until the thermostat operates, but in this case eventual failure of the lamp will not be obvious and excessive boiling may result.

Whilst the apparatus shown and discussed in this description constitutes a preferred embodiment of the invention, it will be recognised that numerous changes and variations may be made in the apparatus without departing from the spirit or scope of the invention.

What I claim is:

1. A system for providing in a motor vehicle water controllable as to amount and temperature up to boiling point, comprising a reservoir for water having a filling means and an outlet, a first conduit connecting said outlet to a heater unit deriving heat from said motor, a second conduit from said heater unit to a water dispensing means, and automatic heat-control means connected by a vapour vent tube to the said heater unit, said heat control means being capable of detecting the actual boiling of the water regardless of the boiling point under prevailing atmospheric pressure and of controlling the rate of heating so as to maintain the water at boiling point without excessive heating.

2. A system according to claim 1 wherein said reservoir comprises a container removably mounted on the vehicle and connected to the system by a quick-disconnect hydraulic coupling means.

3. A system according to claim 1 wherein said reservoir comprises a deformable container which contracts as water is withdrawn.

4. A system according to claim 1 wherein said heater unit comprises an electric heater element deriving energy from the electrical system of a motor vehicle.

5. A system according to claim 1 wherein said reservoir includes cooling means connected through heat transfer means to a refrigerator deriving energy from the internal combustion engine of motor vehicle so that cold water is available from said reservoir.

6. A system according to claim 1 wherein said heater unit comprises heat exchanger means supplied with fluid heated by heat energy generated in the internal combustion engine of a motor vehicle, and said automatic heat control means includes adjustable thermostatic means to control the flow of the heated fluid.

7. A system according to claim 6 wherein said fluid is a gas.

8. A system according to claim 1 wherein said heater unit comprises a boiler means, and said automatic heat control means includes thermal sensor means actuated by ebullition of the water.

9. A system according to claim 8 wherein said sensor means is positioned above the level of the water in the reservoir and over said vapour vent tube which is connected to said boiler means whereby ebullition in said boiler means causes boiling water to rise through said vent tube into contact with said sensor means.

10. A system according to claim 1 wherein said heater unit comprises a first container for water heated to a temperature maintained below boiling point, a second container for water which may be brought to boiling point on the operation of manual control means, and a secondary circulation system for transferring heated water from the first to the second container.

11. A system according to claim 8 wherein the sensor means comprises ebullition indicating means.

12. A system according to claim 1 including a return conduit from said water dispensing means to said heater unit.

13. A system according to claim 5 wherein said water dispensing means comprises a hot water valve and a cold water valve connected to said heater unit and the reservoir respectively, and having a nozzle positioned to fill a drinking vessel mounted in the dispenser.

14. A system according to claim 13 wherein said dispenser comprises a dust-excluding storage enclosure and a movable mounting whereby a drinking vessel may be transferred between the enclosure, a filling position beneath the water outlet, and a convenient position for manual removal.

15. A system according to claim 5 wherein said dispensing means comprises a hot water valve and a cold water valve connected to the heater unit and the reservoir respectively and mounted substantially at or below the level of the bottom of the reservoir.

16. A system according to claim 15 wherein said valves are positioned above the level of the top of said boiler means.

17. A system according to claim 9 wherein said connection comprises a separate return tube for allowing water to return from said sensor means to said boiler means.

18. An apparatus for providing boiling water in a motor vehicle, comprising a reservoir for water having filling means and outlet means, a conduit connecting said outlet to a heater unit deriving heat from said motor, a boiler connected to said heater unit, water dispensing means connected to said outlet means and said boiler, wherein said boiler comprises a heating element positioned in the lower portion of a substantially upright tube having openings below and above said heating element communicating with said heater unit, the upper portion of said boiler being connected by a vent tube to a chamber housing automatic heat-control means capable of detecting actual boiling of the vented water regardless of the boiling point under prevailing atmospheric pressure, said chamber being provided with conduits for returning vapour to said reservoir and water to said heater unit, and said heat-control means being arranged to control the thermal output of said heating element so as to maintain the water at boiling point without excessive heating.

References Cited by the Examiner
UNITED STATES PATENTS

| | | | |
|---|---|---|---|
| 1,555,467 | 9/1925 | Graham | 239—328 |
| 1,986,893 | 1/1935 | Hasbrouck et al. | 237—12.3 |
| 2,241,328 | 5/1941 | Selby | 165—61 |
| 2,839,274 | 6/1958 | Polin | 257—294 |
| 2,846,148 | 8/1958 | Dilworth et al. | 165—30 |
| 2,975,797 | 3/1961 | Mathenly | 222—146 |
| 3,148,675 | 9/1964 | Menuto | 165—46 |

ROBERT A. O'LEARY, *Primary Examiner.*

CHARLES SUKALO, *Examiner.*

JAMES W. WESTHAVER, *Assistant Examiner.*